United States Patent [19]

Andress et al.

[11] Patent Number: 5,033,415
[45] Date of Patent: Jul. 23, 1991

[54] FRICTION REDUCING ADDITIVES AND COMPOSITIONS THEREOF

[75] Inventors: Harry J. Andress, Wenonah; Andrew G. Horodysky, Cherry Hill; Joan M. Kaminski, Mullica Hill, all of N.J.

[73] Assignee: Mobil Oil Corporation, Fairfax, Va.

[21] Appl. No.: 165,437

[22] Filed: Feb. 29, 1988

Related U.S. Application Data

[63] Continuation of Ser. No. 61,595, Jun. 22, 1987, abandoned, which is a continuation of Ser. No. 823,963, Jan. 29, 1986, abandoned, which is a continuation of Ser. No. 536,470, Sep. 28, 1983, abandoned, which is a continuation-in-part of Ser. No. 452,855, Dec. 23, 1982, abandoned, which is a continuation-in-part of Ser. No. 151,037, Jun. 13, 1980, abandoned.

[51] Int. Cl.$^5$ .................. F02B 75/12; C10L 1/10; C09K 15/32
[52] U.S. Cl. .................. 123/1 A; 44/318; 252/49.6; 252/389.41; 252/400.41
[58] Field of Search .......... 44/58, 76; 252/49.6 R, 252/389 R, 389.41, 400.41, 49.6; 260/400, 462; 123/1 A

[56] References Cited

U.S. PATENT DOCUMENTS

| 2,160,917 | 6/1939 | Shoemaker et al. | 252/389 |
| 3,108,966 | 10/1963 | Dadura et al. | 252/389 |
| 3,133,951 | 5/1964 | Nützel et al. | 252/49.6 |

OTHER PUBLICATIONS

Chevron Research Bulletin, "Automotive Engine Oils", p. 8 (1982).

*Primary Examiner*—C. Warren Ivy
*Assistant Examiner*—Raymond Covington
*Attorney, Agent, or Firm*—A. J. McKillop; C. J. Speciale; M. J. Mlotkowski

[57] ABSTRACT

Mixtures of borated alcohols are effective friction modifying additives when incorporated into various lubricating or fuel media.

7 Claims, No Drawings

FRICTION REDUCING ADDITIVES AND COMPOSITIONS THEREOF

This is a continuation of copending application Ser. No. 061,595, filed on Jun. 22, 1987, now abandoned, which is a continuation of application Ser. No. 823,963, filed on Jan. 29, 1986, now abandoned, which is a continuation of application Ser. No. 536,470, filed on Sept. 28, 1983, now abandoned, which is a continuation in part of application Ser. No. 452,855, filed on Dec. 23, 1982, now abandoned, which is a continuation in part of Ser. No. 151,037 filed Jun. 13, 1980, now abandoned.

BACKGROUND OF THE INVENTION

1 Field of the Invention

This invention relates to lubricant additives and compositions thereof and, more particularly, to lubricant compositions comprising oils of lubricating viscosity or greases prepared therefrom containing a minor friction reducing amount of certain borated alcohols or mixtures of borated alcohols.

2 Description of the Prior Art

Many means have been employed to reduce overall friction in modern engines, particularly automobile engines. The primary reasons are to reduce engine wear, thereby prolonging engine life, and to reduce the amount of fuel consumed by the engine, thereby reducing the engine's energy requirements or fuel consumption.

Many of the solutions to reducing fuel consumption have been strictly mechanical, as for example, setting the engines for a leaner burn or building smaller cars and smaller engines. However, considerable work has been done with lubricating oils, mineral and synthetic, to enhance their friction properties by modifying them with friction reducing additives.

Alcohols and mixtures of alcohols have been used as intermediates in the manufacture of a variety of lubricant additives. However, the use of alcohols themselves has not been widespread as engine oil additives because of potential oxidative and thermal instability and volatility difficulties. It has now been found that the borated alcohols provide friction reducing characteristics that the non-borated compositions lack; in addition, the borated derivatives improve oxidative and thermal stability, volatility and bearing corrosion inhibiting properties. These borated alcohols and borated mixtures of alcohols are, to the best of applicants' knowledge, novel and have not been used as multifunctional and/or friction reducing additives in lubricating compositions.

U.S. Pat. No. 2,160,917 discloses lubricants containing low molecular weight borate esters, e.g., borate esters containing from 4 to 12 carbon atoms. The disclosed borates include the tributyl and trilauryl borates. Other patents include U.S. Pat. No. 3,014,870 (to mixtures of amines and certain boronic mono- or diesters); U.S. Pat. No. 3,108,966 (aryl boronic esters and thio acid ester lubricants); U.S. Pat. No. 3,133,951 (fuels containing dialkyl boron esters); U.S. Pat. No. 3,347,793 (tertiaryalkyl boron esters) and U.S. Pat. No. 3,509,054 (esters or boron acids with 2,6-dialkyl-phenols).

SUMMARY OF THE INVENTION

In accordance with the invention there is provided a lubricant or liquid fuel composition consisting essentially of a major amount of a mineral or synthetic hydrocarbon or hydrocarboxy lubricating oil or mixtures thereof, or of a fuel and an antifriction or fuel reducing amount of a trihydrocarbyl boron ester made by reacting a boron-containing compound with an alcohol of the formula

ROH wherein R is a mixture of linear hydrocarbyl groups containing from 12 to 30 carbon atoms. The boron ester, per se, is further provided.

DESCRIPTION OF SPECIFIC EMBODIMENTS

The formula of the alcohols, as mentioned above, is

ROH wherein R is an oleyl, mixture of $C_{12}$ to $C_{30}$ linear alkyl groups or is the corresponding mixed $C_{12}$ to $C_{30}$ groups containing at least one unsaturated bond (e.g., an alkenyl group) in the ester. Among the linear alkyl groups, the mixed $C_{12}$ to $C_{18}$ groups are preferred. More preferred are the mixed $C_{12}$ to $C_{15}$ groups. Among those members containing unsaturation the $C_{15}$ to $C_{30}$ groups are preferred.

To produce the boron triester, which has the formula $(RO)_3B$ where R is as defined above, we prefer to use either boric oxide ($B_2O_3$) or boric acid ($H_3BO_3$). However, the method of making the ester is not limited to these reactants. Any boron compound, such as $BCl_3$, which, when reacted with alcohol will give the desired ester, is embraced hereby. Another method is mentioned below.

The mixtures include those containing from about 10% to about 50% by weight of the alcohol of lower carbon atom content, e.g., $C_{12}$ and from about 50% to about 90% of the remainder of the alcohols, e.g., the $C_{13}$ to $C_{30}$ groups. These latter can be mixed in any proportions relative to each other. An example of the mixtures contemplated is found in Example 2.

The borated derivatives are produced by the reaction of the selected alcohol with boric oxide or boric acid in a suitable solvent or solvents at temperatures ranging from about 110° C. to about 280° C., and in proportions to yield the boron triester. Specific reaction conditions vary with the alcohol reactant mixtures used and are readily determined by one of ordinary skill in the art. Besides direct treatment with boric acid, several other boration procedures which are well known in the art can be used, e.g., transesterification with a trialkyl borate such as tributyl borate. In any event, the boration procedure is conveniently accomplished in a one-pot, one-step process. It is to be noted that the borated alcohols are much more effective friction reducers than their non-borated counterparts and provide protection against bearing corrosion. Also, the higher molecular weight borates are relatively resistant to hydrolysis and retain their friction reducing characteristics even after being in the presence of water at elevated temperatures.

The additive is effective in lubricant compositions for the purposes disclosed in ranges from about 0.1 to about 10% by weight of the total lubricant composition. Preferred is from about 0.5 to 5 wt. %. In general, the additives of this invention may also be used in combination with other additive systems in conventional amounts for their known purpose. The use of additive concentrations of borated alcohols in premium quality automotive and industrial lubricants further improves upon such fluids' fuel economy characteristics. The non-metallic compositions described herein are useful at said moderate concentrations and do not contain any potentially undesirable phosphorus, corrosive sulfur or metallic salts.

The lubricants contemplated for use herein include both mineral oil and synthetic hydrocarbon or hydrocarboxy oils of lubricating viscosity, mixtures of mineral oils and such synthetic oils, and greases prepared therefrom. The synthetic hydrocarbon oils include long chain alkanes such as cetanes and olefin polymers such as trimers and tetramers of octene and decene. These synthetic hydrocarbon oils can be mixed with other synthetic oils which include (1) ester oils such as pentaerythritol esters of monocarboxylic acids having 2 to 20 carbon atoms, (2) polyglycol ethers, and (3) polyacetals. Especially useful among the synthetic esters are those made from polycarboxylic acids and monohydric alcohols. More preferred are the ester fluids made from pentaerythritol, and an aliphatic monocarboxylic acid containing from 1 to 20 carbon atoms, or mixtures of such acids.

It will be further understood that mixtures of synthetic oils include (1) mixtures of hydrocarbon oils of varying weights, obtained either by mixing completed single hydrocarbon oils or by mixing olefins prior to oligomerization, (2) mixtures of hydrocarboxy oils, obtained generally as outlined in (1) and (3) mixtures of (1) and (2).

The fuels contemplated are the liquid fuels, e.g., liquid hydrocarbon fuels such as gasoline, diesel fuel and fuel oil and liquid alcohols such as methanol and ethanol. They are effective in the contemplated fuels to the extent of from about 20 to about 1500 pounds, preferably from about 30 to about 200 pounds thereof per 1000 barrels of fuel.

Having described the invention in general terms, the following are offered as specific illustrations thereof. It is understood they are illustrations only and that the invention is not thereby limited except as by the appended claims.

EXAMPLE 1

Borated Oleyl Alcohol

A mixture of 750 grams of a commercial grade of oleyl alcohol and 60 grams of boric acid were added to about 200 grams of normal butanol. The reaction mixture was stirred to about 270° C. over an 8 hour period to form the final product, essentially trioleyl borate.

EXAMPLE 2

Mixed Linear Alkanols

The mixed linear alcohols (obtained commercially) had an average molecular weight of 208 and a hydroxyl number of 270. Approximately 80% of the alcohols were linear alcohols with the following carbon number distribution: 17.7% $C_{12}$, 30% $C_{13}$, 28% $C_{14}$ and 24% $C_{15}$.

EXAMPLE 3

Borated Mixed $C_{12}$ to $C_{15}$ Linear Alkanols

Approximately 206 grams of mixed linear alkanols similar to those described in Example 2 having an average molecular weight of 206 were charged to a 500 ml flask equipped with an agitator and Dean-Stark tube. Approximately 46 grams of n-butanol and 21 grams of boric acid were added to the flask and the mixture heated to approximately 140° C. over a period of about 4 hours. After the water evolution stopped, the solvents were removed by vacuum distillation and the product was filtered over diatomaceous earth to yield a clear water-white low viscosity fluid.

EXAMPLE 4

Borated Mixed $C_{12}$ to $C_{15}$ Linear Alkanols

Approximately 3032 grams of mixed linear alkanols, 301 grams of boric acid and 250 grams of butanol were reacted in a manner similar to Example 3. After a 4½ hour reactor period at temperatures up to 150° C., the evolution of water ceased. The solvent was removed by vacuum distillation and the product was filtered over diatomaceous earth to yield a clear water-white low viscosity liquid.

EXAMPLE 5

Trilauryl borate made in accordance with U.S. Pat. No. 2,160,917.

EVALUATION OF THE PRODUCTS

Low Velocity Friction Apparatus (LVFA)

The Low Velocity Friction Apparatus (LVFA) is used to measure the friction of test lubricants under various loads, temperatures, and sliding speeds. The LVFA consists of a flat SAE 1020 steel surface (diam. 1.5 in.) which is attached to a drive shaft and rotated over a stationary, raised, narrow ringed SAE 1020 steel surface (area 0.08 in.$^2$). Both surfaces are submerged in the test lubricant. Friction between the steel surfaces is measured as a function of the sliding speed at a lubricant temperature of 250° F. The friction between the rubbing surfaces is measured using a torque arm strain gauge system. The strain gauge output, which is calibrated to be equal to the coefficient of friction, is fed to the Y axis of an X-Y plotter. The speed signal from the tachometer-generator is fed to the X-axis. To minimize external friction, the piston is supported by an air bearing. The normal force loading the rubbing surfaces is regulated by air pressure on the bottom of the piston. The drive system consists of an infinitely variable-speed hydraulic transmission driven by a ½ HP electric motor. To vary the sliding speed, the output speed of the transmission is regulated by a lever cam-motor arrangement.

Procedure

The rubbing surfaces and 12-13 ml. of test lubricant are placed on the LVFA. A 500 psi load is applied, and the sliding speed is maintained at 40 fpm at ambient temperature for a few minutes. A plot of coefficients of friction ($U_k$) over a range of sliding speeds, 5 to 40 fpm (25-195 rpm), is obtained. A minimum of three measurements is obtained for each test lubricant. Then, the test lubricant and specimens are heated to 250° F., another set of measurements is obtained, and the system is run for 50 minutes at 250° F., 500 psi, and 40 fpm sliding speed. Freshly polished steel specimens are used for each run. The surface of the steel is parallel ground to 6 to 8 microinches. The percentages by weight are percentages by weight of the total lubricating oil composition, including the usual additive package. The data are percent decrease in friction according to:

$$\frac{(U_k \text{ of oil alone}) - U_k \text{ of Additive plus oil})}{(U_k \text{ of oil alone})} \times 100$$

Thus, the corresponding value for the oil alone would be zero for the form of the date used in the Table below.

TABLE 1

Friction Test Results Using LVFA

| Test Lubricant | Additive Conc. In Base Blend, (Wt. %) | % Change in Coefficient of Friction in LVFA at 5 Ft./Min. | 30 Ft./Min. |
| --- | --- | --- | --- |
| Base Blend[1] | None | 0 | 0 |
| Base Blend Plus Additive of Example: | | | |
| 1 | 4 | 33 | 29 |
|   | 2 | 31 | 24 |
| 2 | 2 | 3 | 3 |
| 3 | 2 | 32 | 19 |
| 4 | 6 | 33 | 22 |
|   | 2 | 25 | 14 |

[1]Fully formulated 5W/30 synthetic automotive oil.

Fuel Economy Test

The hot-start city cycle screening test was used. This test consists of same-day triplicate tests (or more if necessary) on both the reference oil and test oil using only the Bag 3 cycle EPA urban dynamometer driving schedule. Bag 3 consists of 3.6 miles covering 505 seconds of operation. Only the actual driving cycle of Bag 3 is used and the hot engine start at the beginning of the sequence is not included in the fuel economy measurements.

The test vehicle used was the Buick 3.8 liter (231 CID) equipped with a V-6 engine. The test car was warmed up prior to start of each Bag 3 test by operation at 50 mph steady-state on the chassis-rolls dynamometer until the vehicle's oil sump temperature reached 230°±1° F. The first run of each day required about 20 minutes warm-up, while each subsequent test needed 5-10 minutes. The test or reference lubricants were changed prior to a set of triplicate Bag 3 test runs, using the double-flush, triple filter oil change method. The following data were reported.

TABLE 2

| Test Lubricant | Additive Conc. Wt. % | Fuel Economy Improvement, % |
| --- | --- | --- |
| Base Blend[1] | 0 | 0.0 |
| Base Blend plus Additive of Example: | | |
| 1 | 2 | 0.9 |
| 5 | 2 | −0.1 |

[1]Fully formulated 5W/30 synthetic automotive oil.

This test offers a direct comparison between the additives of the invention (exemplified by the trioleyl borate) and those of the closest prior art (U.S. Pat. No. 2,160,917).

We claim:

1. A lubricant or liquid fuel composition comprising a major proportion of a lubricant or liquid fuel and an antifriction or fuel consumption reducing amount of a trihydrocarbyl boron ester of the formula $$B(OR)_3$$

wherein R is oleyl.

2. The composition of claim 1 wherein the lubricant is (1) a mineral oil, (2) a synthetic oil or a mixture of synthetic oils, (3) a mixture of (1) and (2) or a grease from (1), (2) or (3).

3. The composition of claim 2 wherein the lubricant is a synthetic oil.

4. The composition of claim 2 wherein the lubricant is a mineral oil.

5. The composition of claim 2 wherein the lubricant is a grease.

6. A trihydrocarbyl boron ester of the formula $$B(OR)_3$$

wherein R is oleyl.

7. A method of reducing fuel consumption in an internal combustion engine which comprises (1) lubricating said engine with a composition comprising a major proportion of a lubricating oil and a fuel reducing amount of a trihydrocarbyl boron ester of the formula $$B(OR)_3$$

wherein R is oleyl, (2) fueling said engine with a fuel composition comprising a major proportion of a liquid fuel reducing amount of said ester or (3) lubricating and fueling said engine with said lubricant and fuel compositions.

* * * * *